United States Patent
Demiryont

(12) 
(10) Patent No.: US 7,619,804 B1
(45) Date of Patent: Nov. 17, 2009

(54) ELECTROCHROMIC POLARIZER

(75) Inventor: Hulya Demiryont, Indian Rocks Beach, FL (US)

(73) Assignee: Eclipse Energy Systems, Inc., Saint Petersburg, FL (US)

( * ) Notice: Subject to any disclaimer, the term of this patent is extended or adjusted under 35 U.S.C. 154(b) by 0 days.

(21) Appl. No.: 12/202,862

(22) Filed: Sep. 2, 2008

(51) Int. Cl.
   *G02F 1/15* (2006.01)
(52) U.S. Cl. ....................................... 359/265
(58) Field of Classification Search ............... 359/265
   See application file for complete search history.

(56) References Cited

U.S. PATENT DOCUMENTS 6,961,168 B2 * 11/2005 Agrawal et al. ............. 359/273

2009/0002822 A1 * 1/2009 Tonar et al. .................. 359/493

* cited by examiner

*Primary Examiner*—Joseph Martinez
(74) *Attorney, Agent, or Firm*—David Kiewit

(57) ABSTRACT

The polarization of a beam of radiation can be changed by passing the beam through an electrochromic device (ECD) and applying voltages to the ECD to selectively change the absorption of components of the beam and to change its polarization. This method can operate over a wide spectral region that may extend from 200 nm to 30 µm. In addition, the polarizer can be configured to be tuned by moving the polarizer transversely with respect to a beam of radiation that is characterized by a selected wavelength. In this case either or both of the composition and thickness of the polarizer may vary along the direction of motion in a controlled fashion.

14 Claims, 5 Drawing Sheets

US 7,619,804 B1

ELECTROCHROMIC POLARIZER

BACKGROUND OF THE INVENTION

1. Field of the Invention

The invention relates to methods of polarizing radiation, where the radiation may be infrared radiation. In particular, the invention relates to using a multi-layer solid state thin film electrochromic device for selectively polarizing infrared radiation.

2. Background Information

In U.S. Pat. No. 7,265,890, the disclosure of which is entirely incorporated herein by reference, the inventor teaches multi-layer solid state thin film structures and fabrication techniques for forming electrical devices, and in particular, for forming electrochromic devices for modulating visible, and, more significantly, infrared radiation.

In U.S. Pat. No. 7,265,890 the inventor taught a thin film electrochromic device operable as a tunable optical filter for selectively absorbing infrared radiation in a spectral region characterized by wavelengths between about three and six microns. In the referenced patent the inventor did not teach that the filter was a polarizer particularly suited for use in the mid-IR region, with particular emphasis on an atmospheric window generally encompassing wavelengths between eight and fourteen microns.

BRIEF SUMMARY OF THE INVENTION

One aspect of the invention is that it provides a method of changing the polarization of a beam of radiation from a first state to second state by passing the beam through an electrochromic device (ECD) and applying selected voltages to the ECD to selectively change the absorption of components of the beam and thereby change its polarization.

Another aspect of the invention is that it provides a method for generating a substantially linearly polarized beam of infrared radiation from an input beam of arbitrary polarization.

Yet another aspect of the invention is that it provides a polarizer operable over a wide spectral region that may extend from 200 nm to 30 μm.

A further aspect of the invention is that it provides a polarizer that is tunable for operation at a selected wavelength by moving the polarizer transversely with respect to a light beam so that the beam is incident on a selected portion of the polarizer, wherein either or both of the composition and thickness of the polarizer vary in a controlled fashion.

Although it is believed that the foregoing rather broad summary description may be of use to one who is skilled in the art and who wishes to learn how to practice the invention, it will be recognized that the foregoing recital is not intended to list all of the features and advantages. Those skilled in the art will appreciate that they may readily use both the underlying ideas and the specific embodiments disclosed in the following Detailed Description as a basis for designing other arrangements for carrying out the same purposes of the present invention and that such equivalent constructions are within the spirit and scope of the invention in its broadest form. Moreover, it may be noted that different embodiments of the invention may provide various combinations of the recited features and advantages of the invention, and that less than all of the recited features and advantages may be provided by some embodiments.

DETAILED DESCRIPTION OF A PREFERRED EMBODIMENT

This patent document describes, inter alia, the interaction of inventive devices and solid state structures with electromagnetic radiation. The radiation is generally characterized by having wavelengths between about 200 nm and about 30 μm. This encompasses spectral regions commonly referred to as the near-UV, visible, near-infrared, and mid-infrared as well as extending into the far-infrared.

In studying this patent document, the skilled reader will appreciate that many terms that are sometimes tied to the visible region of the spectrum are also used herein to describe the interaction of electromagnetic radiation with selected media in other spectral regions. For example, the terms 'light' and 'radiation' stand for any radiation in the extended 0.2 to 30 μm spectral region. Correspondingly, terms commonly applied to certain visible-region devices, such as 'electrochromic', 'bleach' and 'color', are herein used across the extended spectral region.

Although the preferred embodiment described herein comprises a reflective-mode electrochromic device (ECD), the reader will note that the invention is not limited to that structure and may be used with a transmission-mode ECD. The transmission-mode ECD, as is known in the art of making ECDs operable in the visible region of the spectrum, comprises a transparent substrate and two transparent electrodes having the active ECD layers sandwiched between them. Those familiar with the spectral variation of material properties will recognize the substantial practical difficulties in providing a transparent substrate (or series of substrates) and a transparent substrate electrode (or series thereof) for operation across the extended spectral region of interest. In the preferred reflective embodiment, on the other hand, the optical properties of the substrate are nearly irrelevant and a mirror electrode adjacent the substrate is relatively easily provided.

In order to emphasize that both reflective and transmissive ECD structures are to be encompassed, this document uses the term 'passes through', and similar terms, to encompass both reflective and transmissive structures. The reader will understand that when incident radiation passes through a tranmissive device, it traverses each active layer once. On the other hand, radiation passing through a reflective ECD traverses each active layer twice.

Figure 1:
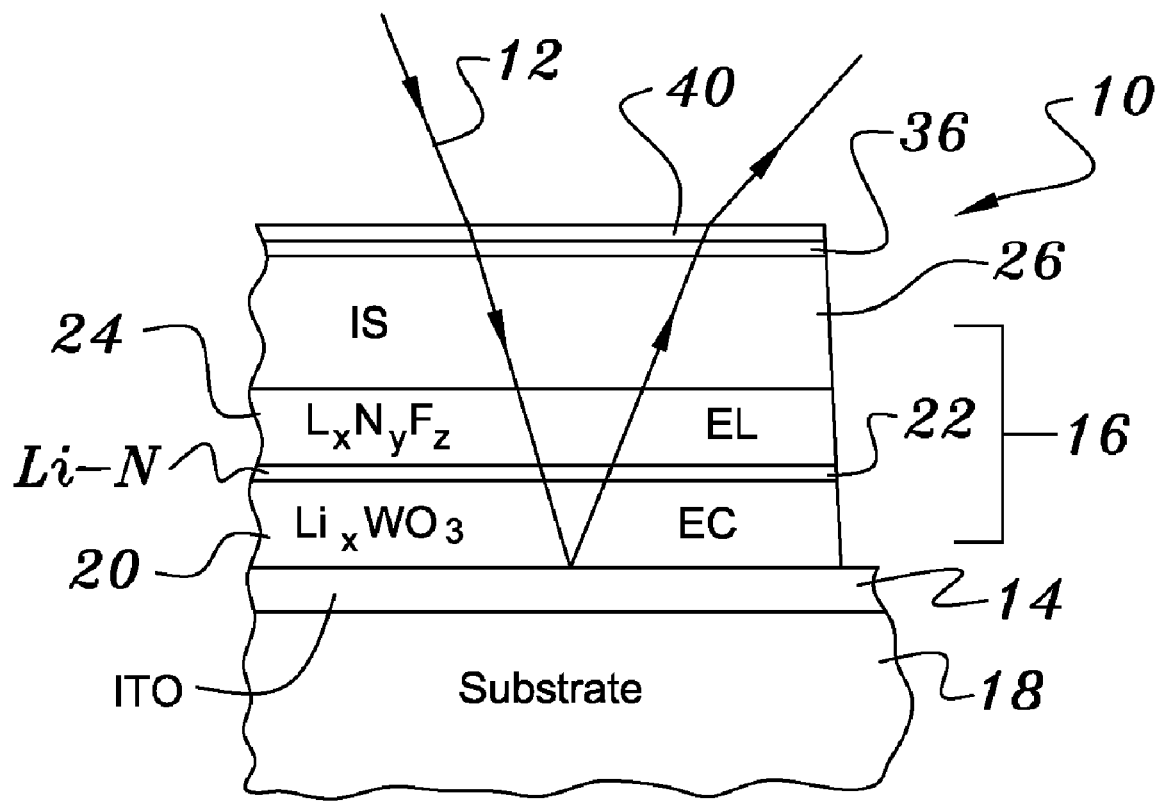
FIG. 1 is a cross-sectional view, taken in a plane of incidence, of an infrared ECD usable for carrying out a method of the invention.

Turning initially to FIG. 1, one finds an ECD 10 of the invention that may be configured to modulate the polarization of light 12 reflected from a mirror-like substrate electrode 14. This ECD comprises a plurality of active layers 16 sandwiched between the substrate electrode and a transparent electrode 36. When the ECD active layers 16 are transparent (or 'bleached'), the beam of external radiation 12 is reflected from a mirror electrode 14. When at least one of the active layers is absorbing (or 'colored'), however, at least some of the radiation is absorbed, rather than being reflected.

For use in the preferred reflective embodiment, the substrate 18 is preferably a flat and rigid electrically conductive mirror, but it is not limited to being either flat or rigid. Reflection of the input IR beam 12 from the conductive substrate mirror electrode generally induces an elliptical state of polarization in the beam, as is well known in the art. This elliptical polarization is characterized by separate reflectivity components in the plane of incidence (i.e., in the plane of FIG. 1) and in a plane perpendicular thereto and by a phase shift between the components. These are described by the well fundamental equation of ellipsometry:

$$\tan\psi\exp(i\delta) = R_p/R_s = (r_p/r_s)\exp(i(\delta_p-\delta_s)),$$

where $r_p$ and $r_s$ are the reflected amplitudes for light polarized parallel and perpendicular, respectively, to the plane of incidence. $R_p$ and $R_s$ are the parallel and perpendicular reflectances, $\psi$ is the amplitude ratio after reflection and $\delta$ is the phase shift on reflection.

Although the depicted embodiment of the ECD is configured with it electrochromic (EC) layer adjacent the substrate and with its ion storage (IS) layer distal therefrom, alternate embodiments could be configured with the active layers arranged in the opposite order—i.e., with the IS layer adjacent the substrate and the EC layer distal therefrom.

Figure 2:
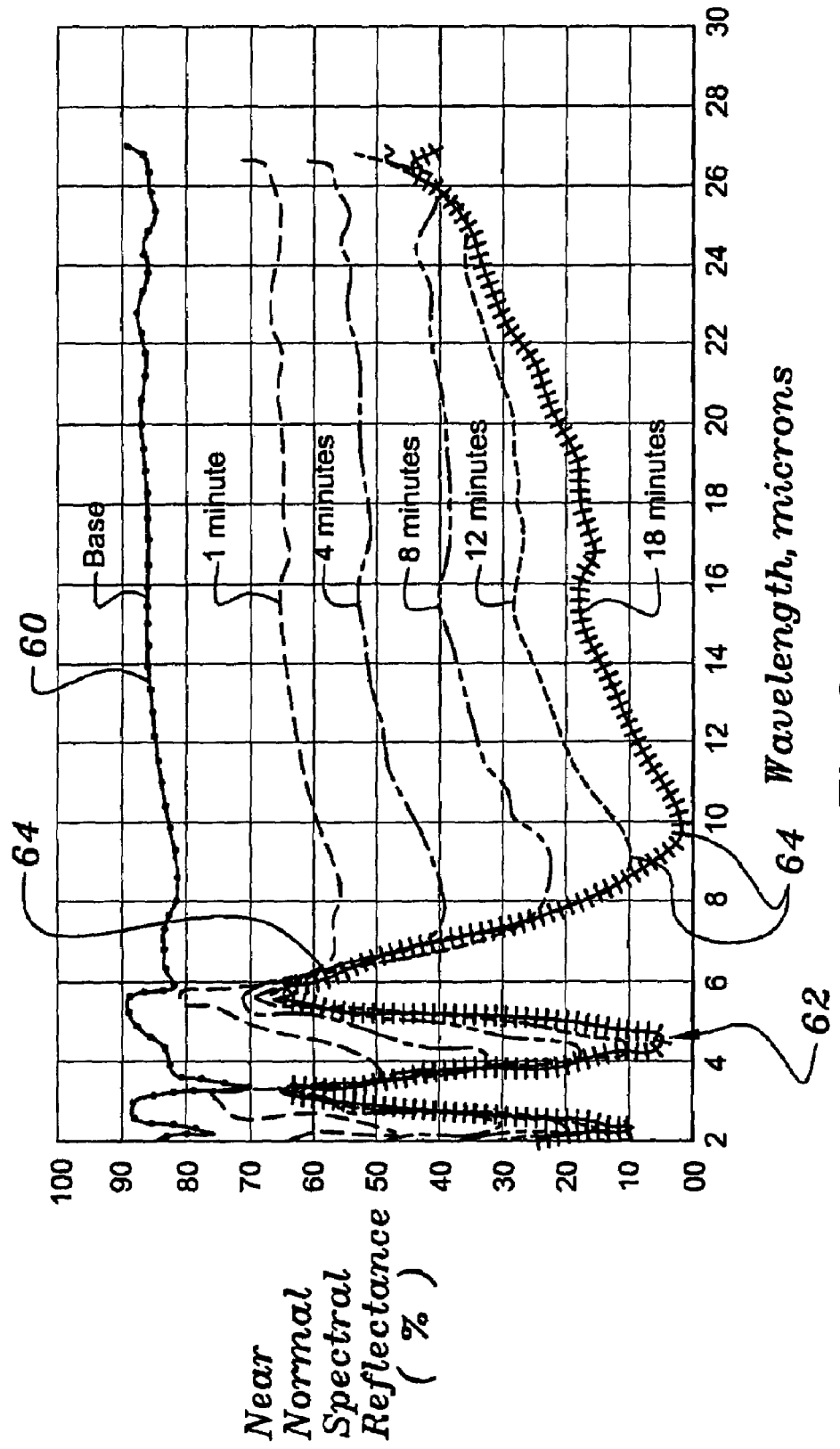
FIG. 2 depicts the spectral variation of near-normal incidence reflectance for an ECD in the bleached state and in colored states associated with varying times after which a coloring voltage was first applied.
Figure 3A:
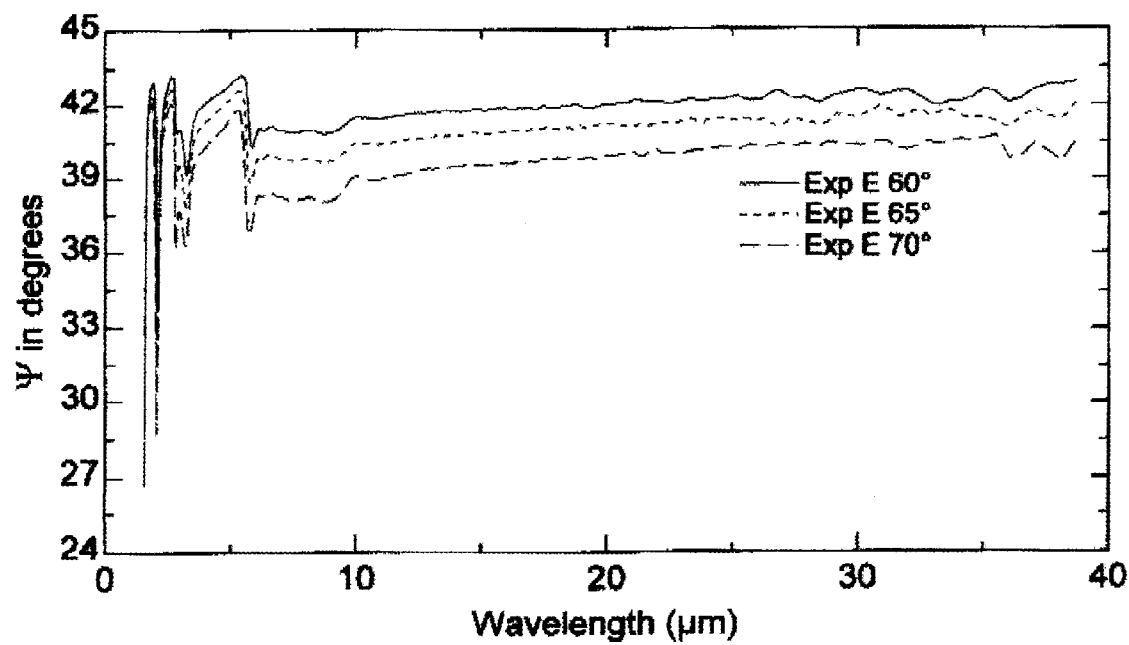
FIG. 3A shows the spectral variation of ψ for several angles of incidence for a device of the sort shown in FIG. 1, where the device is in the bleached state.
Figure 3B:
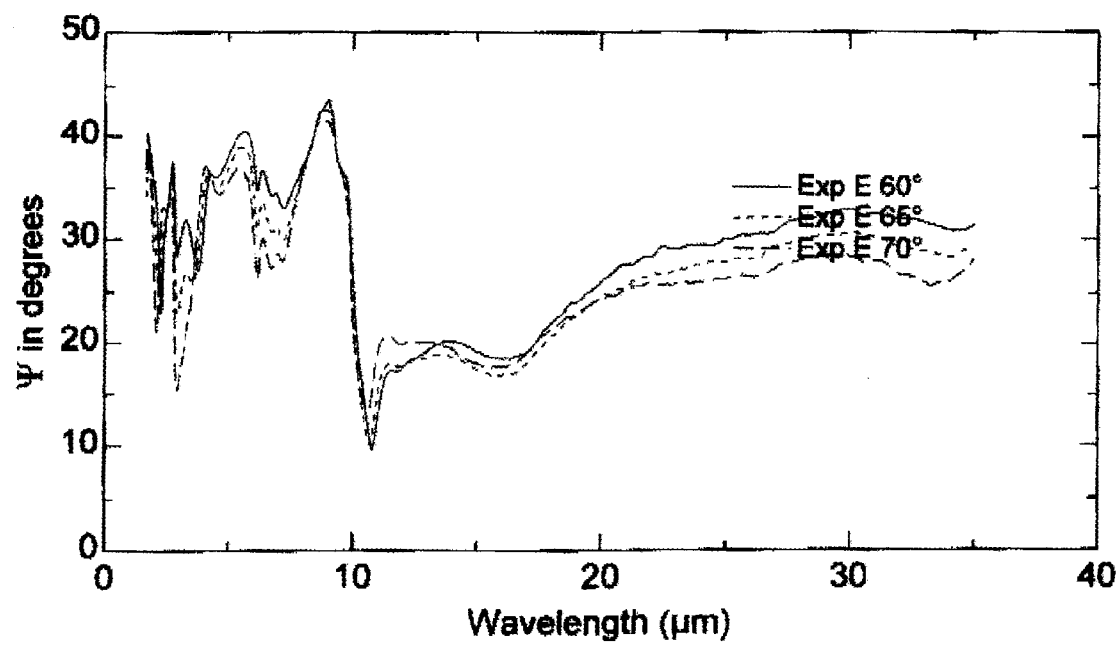
FIG. 3B shows the spectral variation of ψ for the device of FIG. 3A, where the device is in the colored state.
Figure 4A:
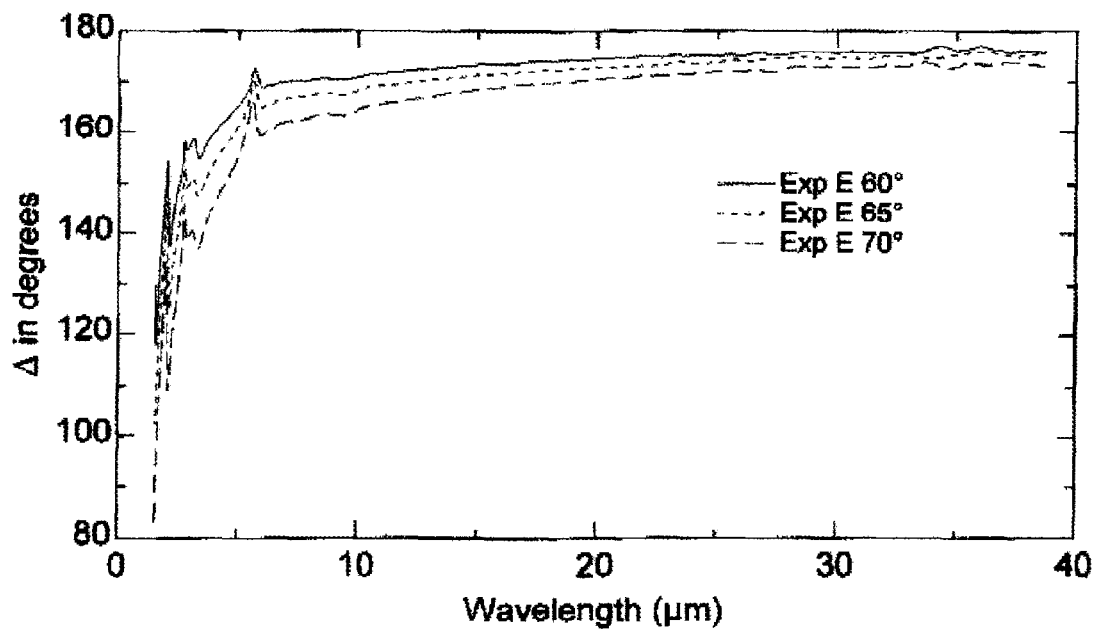
FIG. 4A shows the spectral variation of Δ for the device and angles of incidence of FIG. 3A, where the device is in the bleached state.
Figure 4B:
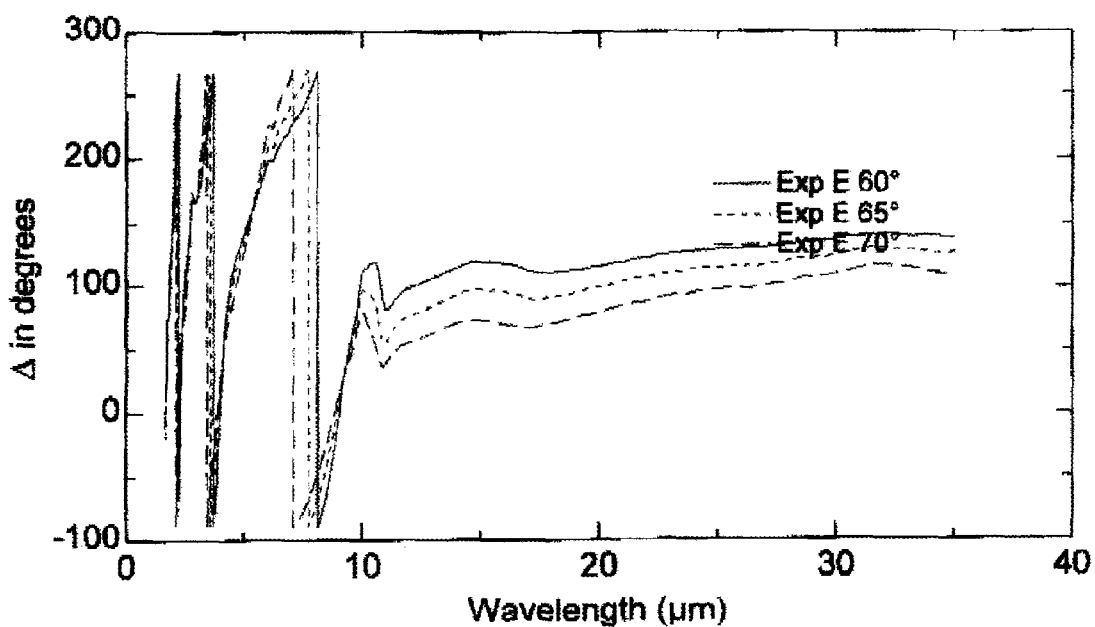
FIG. 4B shows the spectral variation of Δ for the device and angles of incidence of FIG. 3A, where the device is in the colored state.

Turning now to FIG. 2, one finds reflectance spectra in the 1.3 to 27 micron region measured from an ECD previously described in the inventor's U.S. Pat. No. 7,265,890. In this figure, different curves correspond to various times during the process of coloring. The uppermost curve 60 of this set is the spectral reflectance of an open circuit or self-bleached ECD and is consistent with the transparent metal layer electrode having a transmittance of near 90% across the entire measured spectral interval. A positive voltage is applied to the IS electrode at a zero on the time scale to begin coloring the ECD by moving ions from the IS to the EC layer. As this EC loading progresses with time—where various times ranging from zero to eighteen minutes are depicted in FIG. 2—over most of the measured spectral region, more and more of the incident radiation is absorbed in the EC layer rather than being reflected from the mirror-like substrate electrode. At some wavelengths, e.g., around 1.3 microns to 5 microns, this effect is substantially less pronounced than elsewhere. This electrochromic device thus provides a controllable absorption in a spectral region comprising some wavelengths lying between about 1 and 27 microns, although the extent of utility is not uniform across the entire region.

The family of curves in FIG. 2 show several minima in reflectance (i.e., absorption peaks). One of these minima 62 lies generally between 1.3 and 5 microns and another minimum 64 lies generally between 6 and 10 microns. In U.S. Pat. No. 7,265,890 the inventor noted that the magnitude of absorption increases with time during coloring, and the position of each peak shifts to longer wavelengths as the coloring time increases. It has been subsequently observed that the magnitude of absorption depends on the state of polarization of incident light so that an ECD can be configured as a polarizer in the region of any such local minimum.

Experiments were conducted on reflective-mode ECD's fabricated in accord with the teaching of the inventor's U.S. Pat. No. 7,265,890. This patent teaches a device comprising a plurality of thin solid films successively deposited on a substrate. The first of these films is a substrate electrode deposited on a suitably prepared substrate. A plurality of layers comprising at least an electrochromic layer, an electrolyte layer, an ion storage portion; and a substantially transparent metal layer are then preferably deposited on the substrate electrode. In particular, optical measurements were made on a device in which the substrate electrode 14 was indium-tin-oxide (ITO), the electrochromic (EC) layer 20 was lithiated tungsten oxide and was separated from the lithium-fluoronitride electrolyte (EL) layer 24 by a lithium nitride ion transfer layer 22, the ion storage (IS) layer 26 comprised a lithiated vanadium oxide, and the transparent top electrode 36 comprised a thin silver film.

Ellipsometry measurements on the experimental sample were carried out on two different instruments operable in different spectral regions. Measurements in the near-UV, visible, and near-IR regions of the spectrum were made using a V-VASE variable angle spectroscopic ellipsometer supplied by the J. A. Woolam Company of Lincoln, Nebr. Infrared measurements were made using a VB-40 VASE variable angle spectroscopic ellipsometer supplied by the J. A. Woolam Company of Lincoln, Nebr. and operable in the 2-40 μm spectral region.

Turning now to FIGS. 3A, 3B, 4A, and 4B, one finds the amplitude ratio $\psi$ and the phase shift $\delta$ that resulted from ellipsometry measurements on the exemplar device. The measurements were made at three different angles of incidence (60°, 65°, and 70°) and for samples in both the bleached (FIGS. 3A, 4A) and colored (FIGS. 3B, 4B) conditions. In the bleached condition, no voltage was applied to the device. In the colored condition a voltage of approximately 1 V was applied.

Figure 5:
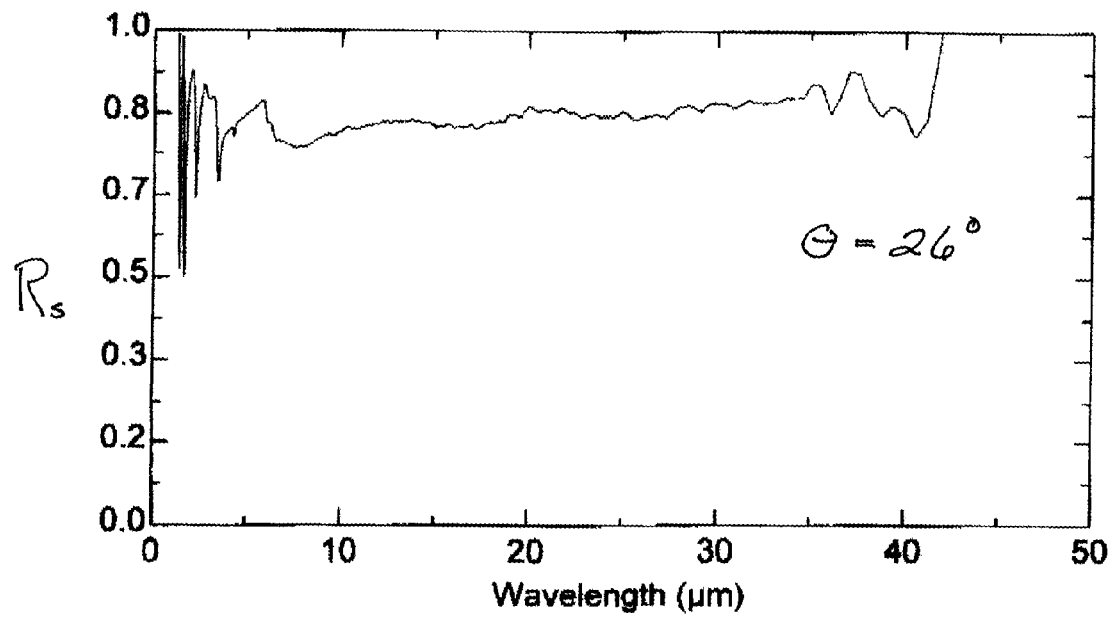
FIG. 5 shows the spectral variation of the reflection component Rs for the device of FIG. 3A in the bleached state for an angle of incidence of 26°.
Figure 6:
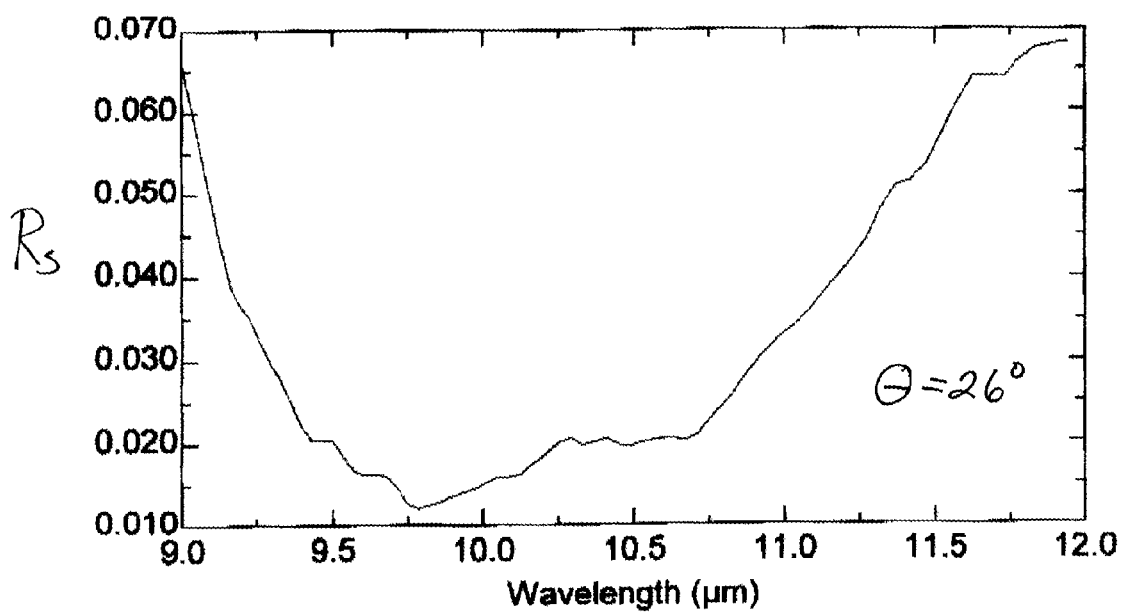
FIG. 6 is a detailed view in a restricted wavelength region of the reflection component Rs for the device of FIG. 3A in the colored state for an angle of incidence of 26°.

In FIG. 5, one finds the spectral variation of the perpendicular reflectance, $R_s$, derived from ellipsometric measurements made using a 26° angle of incidence for a sample in the bleached condition. Sharp local minima in $R_s$ for the bleached ECD are noted at several wavelengths in the visible and near IR, and at about four μm. A broader local minimum is noted at about 9-12 μm. The effect of applying a coloring voltage to this device is depicted in FIG. 6, which shows that the s-component of the reflectance near 10 μm is nearly eliminated by coloring the ECD. In particular, $R_s$ drops from about 75% to about 1% on application of the coloring voltage. The light reflected from the colored ECD at the peak wavelength of about 9.7 μm is essentially all the p-component. Thus, applying a coloring voltage to the experimental device provides a beam of light that is essentially linearly polarized parallel to the plane of incidence.

Although the present invention has been described with respect to several preferred embodiments, many modifications and alterations can be made without departing from the invention. Accordingly, it is intended that all such modifications and alterations be considered as within the spirit and scope of the invention as defined in the attached claims.

The invention claimed is:

1. A method of changing the polarization of a beam of radiation, the method comprising the steps of: a) providing an electrochromic device (ECD) having a bleached state in which most of the radiation passes through the device, the ECD comprising a plurality of thin solid films sequentially deposited on a substrate, the thin films comprising a first electrode abutting the substrate and a second electrode separated from the first electrode by a electrochromic layer, an electrolyte layer and an ion storage layer, wherein at least one of the two electrodes is transparent to the radiation; b) directing the beam toward the ECD so that the beam passes through the ECD when the ECD is in the bleached state; and c) applying a selected voltage between the two electrodes to change the polarization of the reflected beam.

2. The method of claim 1 wherein the radiation comprises wavelengths extending about a central wavelength at which there is a local minimum in the amount of radiation that passes through the ECD when the ECD is in the bleached state.

3. The method of claim 1 wherein the plurality of active layers in the ECD comprise an electrochromic layer comprising lithiated tungsten oxide; an ion transfer layer comprising lithium and nitrogen, the ion transfer layer vacuum deposited directly on the electrochromic layer; an electrolyte layer comprising lithium fluoro-nitride; and an ion storage layer comprising an oxide of vanadium.

4. The method of claim 1 wherein the method is optimized for a selected wavelength within a selected band of wavelengths by providing the ECD with a thickness, measured between the two electrodes, that varies along a selected direction; and moving the ECD along the selected direction and transverse to the beam so that the beam is incident on a portion of the ECD providing optimal polarization at the selected wavelength.

5. The method of claim 1 wherein the method is optimized for a selected wavelength within a selected band of wavelengths by providing the ECD with composition that varies along a selected direction; and moving the ECD along the selected direction and transverse to the beam so that the beam is incident on a portion of the ECD providing optimal polarization at the selected wavelength.

6. A method of changing the polarization of a beam of radiation comprised of wavelengths within a selected band of wavelengths, the method comprising the steps of:
providing an electrochromic device (ECD) comprising a plurality of thin solid film layers deposited on a substrate, the thin solid film layers comprising a first electrode abutting the substrate and a second electrode separated from the first electrode by an electrochromic layer, an electrolyte layer and an ion storage layer, wherein at least one of the electrodes is transparent to the radiation, the ECD characterized by a bleached state absorption that is higher within the selected band of wavelengths than outside it;
b) directing the beam toward the ECD so that the beam passes through the ECD when the ECD is in the bleached state; and
c) applying a selected voltage between the two electrodes to change the polarization of the reflected beam.

7. The method of claim 6 wherein the method is optimized for a selected wavelength within the selected band of wavelengths by providing the ECD with a thickness, measured between the two electrodes, that varies along a selected direction; and moving the ECD along the selected direction and transverse to the beam so that the beam is incident on a portion of the ECD providing optimal polarization at the selected wavelength.

8. The method of claim 6 wherein the method is optimized for a selected wavelength within the selected band of wavelengths by providing the ECD with composition that varies along a selected direction; and moving the ECD along the selected direction and transverse to the beam so that the beam is incident on a portion of the ECD providing optimal polarization at the selected wavelength.

9. The method of claim 6 wherein the plurality of active layers in the ECD comprise an electrochromic layer comprising lithiated tungsten oxide; an ion transfer layer comprising lithium and nitrogen, the ion transfer layer vacuum deposited directly on the electrochromic layer; an electrolyte layer comprising lithium fluoro-nitride; and an ion storage layer comprising an oxide of vanadium.

10. A method of polarizing a beam of infrared radiation, the method comprising the steps of:
a) providing a rigid substrate having a mirror surface, the mirror surface comprising a reflective electrode portion of an electrochromic device, the electrochromic device further comprising a plurality of thin solid films, the films consisting of:
an electrochromic layer comprising lithiated tungsten oxide, formed directly on the reflective electrode; an ion transfer layer comprising lithium and nitrogen, the ion transfer layer vacuum deposited directly on the electrochromic layer;
an electrolyte layer comprising lithium fluoro-nitride, the electrolyte layer vacuum deposited directly on the ion transfer layer;
an ion storage layer comprising an oxide of at least one of vanadium and praseodymium, the ion storage layer vacuum deposited directly on the electrolyte layer; and
a thin transparent electrode layer;
b) directing the beam toward the ECD so that the beam is initially incident on the transparent electrode at a selected angle of incidence lying in a plane of incidence and so that the beam reflects from the reflective electrode;
c) applying a selected voltage between the reflective and transparent electrodes so as to color the ECD and thereby selectively absorb infrared radiation having a polarization component perpendicular to the plane of incidence, leaving an infrared beam polarized parallel to the plane of incidence.

11. A method of changing the polarization of a beam of radiation comprising a selected wavelength, the method comprising the steps of:
a) providing an electrochromic device (ECD) having a bleached state in which most of the radiation passes through the device, the ECD comprising a plurality of active layers disposed between two electrodes, at least one of which is transparent to the radiation, the ECD having at least one of a thickness and a composition that varies along a selected direction;
b) directing the beam toward the ECD so that the beam passes through the ECD when the ECD is in the bleached state;
c) applying a selected voltage between the two electrodes to change the polarization of the reflected beam and d) moving the ECD along the selected direction and transverse to the beam so that the beam is incident on a portion of the ECD providing optimal polarization at the selected wavelength.

12. The method of claim 11 wherein the thickness varies along the selected direction.

13. The method of claim 11 wherein the composition varies along the selected direction.

14. The method of claim 11 wherein both the thickness and the composition vary along the selected direction.

* * * * *